(12) United States Patent
Takahata

(10) Patent No.: US 8,753,780 B2
(45) Date of Patent: Jun. 17, 2014

(54) ELECTRODE INCLUDING BARRIER LAYER CONTAINING TWO CONDUCTIVE POWDERS WITH DIFFERENT PARTICLE DIAMETERS AND METHOD FOR PRODUCING THE SAME

(75) Inventor: Koji Takahata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 611 days.

(21) Appl. No.: 12/863,632

(22) PCT Filed: Jan. 14, 2009

(86) PCT No.: PCT/JP2009/050383
§ 371 (c)(1),
(2), (4) Date: Jul. 20, 2010

(87) PCT Pub. No.: WO2009/093504
PCT Pub. Date: Jul. 30, 2009

(65) Prior Publication Data
US 2010/0297497 A1 Nov. 25, 2010

(30) Foreign Application Priority Data
Jan. 23, 2008 (JP) ................. 2008-013095

(51) Int. Cl.
*H01M 4/1391* (2010.01)
*H01M 4/62* (2006.01)
*H01M 4/66* (2006.01)
*H01M 10/0525* (2010.01)

(52) U.S. Cl.
USPC ........ 429/232; 429/209; 429/231.1; 429/233; 29/623.1

(58) Field of Classification Search
USPC .............. 429/209, 231.1, 232, 233; 29/623.1
See application file for complete search history.

(56) References Cited

U.S. PATENT DOCUMENTS

| 2004/0130038 A1* | 7/2004 | Murakami et al. ............. 257/783 |
| 2007/0177332 A1* | 8/2007 | Kobayashi et al. ........... 361/502 |

(Continued)

FOREIGN PATENT DOCUMENTS

| JP | 06084699 A | * 3/1994 |
| JP | 9-97625 | 4/1997 |

(Continued)

OTHER PUBLICATIONS

Fukumasa et al., Machine translation of JP 06-084699 A, Mar. 1994.*

(Continued)

*Primary Examiner* — Sean P Cullen
(74) *Attorney, Agent, or Firm* — Finnegan, Henderson, Farabow, Garrett & Dunner, LLP

(57) ABSTRACT

Disclosed is an electrode (30) (for example, a positive electrode for a lithium ion battery), wherein an active material layer (35) mainly composed of an electrode active material is supported by a metal collector (32). A barrier layer (33) containing a conductive material (330) and a water-insoluble polymer material (334) are formed on the surface of the metal collector (32). The conductive material (330) contains at least a first conductive powder (331) having a certain average particle diameter, and a second conductive powder (332) having an average particle diameter larger than that of the first conductive powder. The ratio of the first conductive powder (331) contained in the barrier layer (33) is higher than that of the second conductive powder (332).

13 Claims, 5 Drawing Sheets

(56) References Cited

U.S. PATENT DOCUMENTS

2008/0226988 A1* 9/2008 Minami et al. ............. 429/231.5
2008/0261112 A1* 10/2008 Nagata et al. ............. 429/218.1

FOREIGN PATENT DOCUMENTS

| | | | |
|---|---|---|---|
| JP | 11-283628 | | 10/1999 |
| JP | 2003-157852 | | 5/2003 |
| JP | 2006-4739 | | 1/2006 |
| JP | 2006004739 A | * | 1/2006 |
| JP | 2007026786 A | * | 2/2007 |
| JP | 2007-80652 | | 3/2007 |
| JP | 2007080652 A | * | 3/2007 |

OTHER PUBLICATIONS

Kurachi, S., Machine translation of JP 2006-004739 A, Jan. 2006.*

Saito et al., Machine translation of JP 2007-080652, Mar. 2007.*

Miyazaki et al., Machine translation of JP 2007-026786 A, Feb. 2007.*

International Search Report in International Application PCT/JP2009/050383, mailed Apr. 14, 2009.

Office Action dated Apr. 25, 2012, issued in Korean Patent Application No. 10-2010-7016470.

* cited by examiner

ELECTRODE INCLUDING BARRIER LAYER CONTAINING TWO CONDUCTIVE POWDERS WITH DIFFERENT PARTICLE DIAMETERS AND METHOD FOR PRODUCING THE SAME

TECHNICAL FIELD

The present invention relates to an electrode for use as a component of a battery (for example, a lithium ion battery), and to a method of producing the same.

The priority claim for this application is based on Japanese Patent Application No. 2008-013095 submitted on Jan. 23, 2008, and the entire content of that application is incorporated herein by reference.

BACKGROUND ART

Electrodes are known comprising a current collector supporting a material capable of releasing a chemical species that functions as a charge carrier. One example of such an electrode is a secondary cell electrode comprising a metal collector supporting a material (active material) capable of reversibly storing and releasing such a chemical species. This electrode can be used favorably as the positive or negative electrode of a lithium ion battery that is charged and discharged by means of the movement of lithium ions to and from an electrolyte (typically a nonaqueous electrolyte) interposed between this electrode and a counter-electrode. A typical method of supporting the active material on the collector is to apply to the electrode collector a paste or slurry composition (active material composition) comprising a powder of an active material dispersed in a solvent to thereby form a layer of the active material (active material layer). From the standpoint of reducing environmental impact, reducing material costs, simplifying the equipment, reducing waste volume and improving the handling properties and the like, the active material composition used in this method is preferably an aqueous composition, in which the solvent constituting the above medium (dispersion medium for the active material powder or the like) is an aqueous solvent.

Depending on the makeup of the active material, however, using an aqueous composition may lead to problems of decreased battery capacity or reduced discharge characteristics due to increased initial internal resistance. This may occur because the active material reacts with water contained in the paste. For example, when a lithium-nickel oxide or other lithium-transition metal oxide (here and below, an oxide containing lithium and one or two or more transition metal elements as constituent metal elements) is used as a positive-electrode active material, an exchange reaction occurs between lithium ions and protons on the surface of the positive-electrode active material dispersed in an aqueous solvent, which may raise the pH value (that is, the alkalinity) of the aqueous active material composition. When this high-pH aqueous active material composition is applied to a positive-electrode collector (for example, an aluminum positive-electrode collector), compounds exhibiting high electrical resistance (for example, oxides or hydroxides) are more likely to occur on the surface of the collector. Production of such high-electrical-resistance compounds can cause increased initial internal resistance in the battery (thereby interfering with high output).

In this regard, Patent Document 1 describes a technique for avoiding the phenomenon of high-electrical-resistance compounds occurring during formation of an active material layer by application of an aqueous active material composition by providing a layer containing an organic solvent-soluble polymer (binder) and a conductive material (conductive layer) on the surface of the collector, and using this layer as a barrier layer to block direct contact between the collector and water.

Patent Document 1: Japanese Patent Application Laid-open No. 2006-4739

Such a barrier layer must have both water-resistance (the property of blocking direct contact between water and the collector to prevent production of high-electrical-resistance compounds) and electrical conductivity (in other words, the property of not excessively raising the resistance between the active material layer and the collector layer). However, these two properties normally conflict with each other. For example, increasing the percentage content of the conductive material in the barrier layer is an effective way of improving the conductivity of an electrode having this barrier layer, but merely increasing this percentage will tend to reduce the water resistance of the barrier layer because the percentage content of the binder is reduced proportionally. Conversely, increasing the percentage content of the binder in order to improve the water resistance of the barrier layer tends to reduce the electrical conductivity because the content of the conductive material is reduced proportionally.

DISCLOSURE OF THE INVENTION

It is therefore an object of the present invention to more thoroughly resolve the problems involved in manufacturing an electrode (such as a lithium ion battery electrode) using an aqueous active material composition, and to provide an electrode that offers stable high performance despite being produced using an aqueous active material composition. It is another object of the present invention to provide a method of producing a high-performance electrode using an aqueous active material composition. It is also an object of the present invention to provide a lithium ion battery or other battery configured using this electrode, and a vehicle equipped with this battery.

The present invention provides an electrode (for example, a positive electrode for a lithium ion battery) in which an active material layer formed mainly of an electrode active material is supported by a metal collector. A barrier layer containing conductive material and a water-insoluble polymer material is provided on the surface of the collector. This conductive material comprises at least a first conductive powder having a predetermined average particle diameter (here and below, the average particle diameter of the particles making up the powder) and a second conductive powder having a particle diameter greater than that of the first conductive powder. The percentage content of the first conductive powder in the barrier layer is preferably greater than the percentage content of the second conductive powder.

With such an electrode, the loss of water resistance that accompanies an increase in the content of conductive material can be controlled by mixing (combining) a relatively large-particle second conductive powder with a relatively small-particle first conductive powder instead of using only the first conductive powder as the conductive material. That is, the conductivity of the barrier layer can be improved with less loss of water resistance. As a result, the conductivity of the barrier layer (and therefore conductivity between the active material layer and collector) is improved while maintaining high water resistance in the barrier layer (for example, water resistance sufficient to effectively prevent occurrence of high electrical resistance compounds even when the active material layer is formed using an aqueous active material composition), to thereby provide a high-performance electrode. A battery equipped with this electrode can also provide better performance (such as high output).

In this Description, the term "battery" refers in general to storage devices capable of yielding electrical energy, and encompasses both primary batteries and secondary batteries (including lithium ion batteries, metal lithium secondary batteries, nickel hydrogen batteries, nickel cadmium batteries and other so-called storage batteries as well as electrical double-layer capacitors and other storage elements).

The average particle diameter of the second conductive powder is preferably about two times or more (typically about 2 to 500 times) the average particle diameter of the first conductive powder. By thus using a second conductive powder having much larger particles than the first conductive powder, it is possible to reduce the viscosity of a composition comprising the components of the barrier layer dispersed in a suitable solvent (barrier layer-forming composition) in view of the content of the conductive material. Consequently, the solids concentration of the composition can be further increased while still providing sufficiently good handling properties (such as coating properties when applying the composition to the collector (gravure coating or the like)) when forming the barrier layer on the surface of the collector using the composition. This is desirable from the standpoint of reducing the time and energy required to dry the barrier layer-forming composition, reducing the amount of solvent used, and the like.

In a preferred embodiment of the electrode disclosed here, the average particle diameter of the second conductive powder is greater than the thickness of the barrier layer. That is, multiple (typically multitudes of) bumps are formed on the surface of the barrier layer by protruding particles of the second conductive powder. This uneven surface serves to increase the surface area of the barrier layer (area of contact with the active material layer). With an electrode of this configuration, better conductive paths are formed between the barrier layer and the active material layer, allowing for more efficient electron movement between the two layers (or in other words reduced interface resistance between the barrier layer and active material layer). Consequently, a higher-performance electrode can be provided.

The present invention provides a method of producing an electrode (for example, an electrode for a lithium ion battery) in which an active material layer formed mainly of an electrode active material is supported by a metal current collector. This method comprises preparing a barrier layer-forming composition containing conductive material, a water-insoluble polymer material and a solvent for dissolving the polymer material. This barrier layer-forming composition is prepared using as the conductive material at least a first conductive powder with a predetermined average particle diameter and a second conductive powder with an average particle diameter greater than that of the first conductive powder, in such a way that the percentage content of the first conductive powder is greater than the percentage content of the second conductive powder. The electrode manufacturing method disclosed here comprises forming a barrier layer on the surface of the collector by applying the aforementioned barrier layer-forming composition to the collector. It also comprises forming an active material layer by applying an aqueous active material composition to the collector having the barrier layer formed thereon.

Because in this production method a barrier layer is formed on the collector surface before the active material composition is applied, contact between the active material composition and the collector surface can be prevented by means of the barrier. Thus, with this production method it is possible to adequately prevent production of the aforementioned high-electrical-resistance compounds even using an aqueous active material composition. Moreover, in a barrier layer formed using this barrier layer-forming composition loss of barrier properties due to increased content of the conductive powder is controlled as discussed above. Consequently, with this production method it is possible to manufacture a high-performance electrode (which can be used to make a high-performance battery) in which an increase in resistance between the active material layer and the collector is controlled while maintaining the high water resistance of the barrier layer.

In a preferred embodiment of the electrode production method disclosed here, the barrier layer-forming composition is prepared by mixing the second conductive powder and the water-insoluble polymer material together with the solvent, and then combining the first conductive powder with this mixture. With this mode of preparation it is possible to more uniformly disperse the first conductive powder, which has a relative small particle diameter, in the barrier layer-forming composition. With this composition it is possible to form a barrier layer which is more electrically conductive because the first conductive powder is more uniformly dispersed.

In another preferred embodiment of the electrode production method disclosed here, the solvent in the barrier layer-forming composition is an organic solvent. Using a barrier layer-forming composition of this composition (that is, a solvent composition), it is possible to form a more water-resistant barrier layer (for example, one whereby contact between water and the collector can be prevented long-term).

The present invention provides a battery (for example, a secondary battery and preferably a nonaqueous secondary battery) configured using any of the electrodes disclosed here. A battery using such an electrode can have high performance because production of high electrical resistance compounds on the collector surface in the electrode is prevented, and electrical conductivity between the active material layer and collector layer is improved. A lithium ion battery configured using any of the electrodes disclosed here as the positive electrode is a typical example of a battery provided by the present invention.

The present invention provides a vehicle equipped with any of the lithium ion batteries disclosed here (which may be a lithium ion battery using as the positive electrode an electrode produced by any of the methods disclosed here for example). This lithium ion battery may be one that provides the high performance (for example, high output) suited to a lithium ion battery mounted in a vehicle. Consequently, it can be used favorably as a power source for motors installed in automobiles and other vehicles.

BEST MODE FOR CARRYING OUT THE INVENTION

Figure 1:
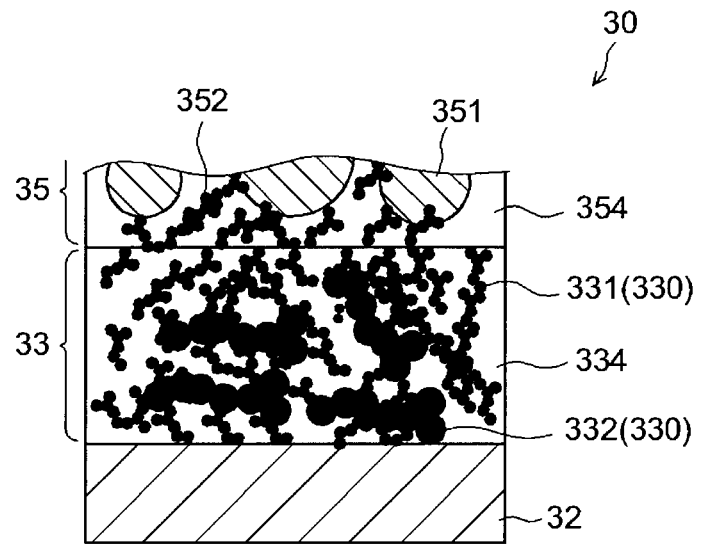
FIG. 1 is a model cross-section for explaining the functions of an electrode of one embodiment.

Preferred embodiments of the present invention are explained below. Matters necessary for implementing the present invention that are not particularly mentioned in this Description can be understood as design matters by a person skilled in the art based on prior art in the field. The present invention can be implemented based on the content disclosed herein and on technical common knowledge in the field.

The technology disclosed here can be applied favorably to various kinds of electrodes comprising active material layers supported on current collectors for example, wherein the active material is such that when an aqueous active material composition is used to form the active material layer, the liquidity of the composition is likely to become more alkaline (typically, the active material can shift the liquidity towards alkaline upon contact with water). Typical examples of such active substances include lithium-nickel oxides and other lithium-transition metal oxides.

The technology disclosed here is particularly effective when applied to cases in which the collector in the electrode is made of a material that may produce compounds with high electrical resistance on its surface upon contact with an alkaline aqueous composition. Typical examples of such materials include aluminum (Al), alloys consisting primarily of aluminum (aluminum alloys) and other aluminum materials. Other examples include zinc (Zn), tin (Sn) and other amphoteric metals and alloys in which these metals are primary components.

The form of the collector used is not particularly limited and differs according to the form of the battery (typically a secondary battery) to be configured using the resulting electrode, but possible forms include bar, plate, sheet, foil and mesh forms and the like. The technology disclosed here can be applied favorably to the manufacture of an electrode using a sheet or foil collector for example. A preferred embodiment of a battery configured using an electrode produced by this method is a battery provided with an electrode assembly comprising a sheet-shaped positive electrode and negative electrode typically coiled together with a sheet-shaped separator (coiled electrode assembly). The outer form of the battery is not particularly limited, and examples include oblong, flat and cylindrical batteries and the like.

A typical example of an electrode suited to application of the technology disclosed here is the positive electrode of a lithium ion battery having a lithium-transition metal oxide as the active material, wherein an active material layer consisting primarily of this active material is supported on a collector made of an aluminum material. The present invention is explained in more detail below primarily as it is applied to a positive electrode for a lithium ion battery, the production thereof and a lithium ion battery configured using this electrode, but application of the present invention should not therefore be limited to this electrode or battery.

An oxide with a layered or spinel structure capable of functioning as the positive-electrode active material of this kind of lithium ion battery can be selected appropriately and used as the lithium-transition metal oxide (typically particulate) that is the active material (principal component of the active material layer) of the electrode for a lithium ion battery. For example, it is desirable to use one or two or more lithium-transition metal oxides selected from the lithium-nickel, lithium-cobalt and lithium-manganese oxides. The technology disclosed here is particularly applicable to a positive electrode using a lithium-nickel oxide for the positive-electrode active material (typically, the positive-electrode active material effectively consists of a lithium-nickel oxide). The advantage of a lithium-nickel oxide over a lithium-cobalt or lithium-manganese oxide is that the Li is more easily eluted when the oxide is dispersed in an aqueous solvent (and consequently the liquidity of the aqueous active material composition is shifted more strongly towards alkalinity). As a result, the effects obtained by applying the method disclosed here are especially advantageous when producing an electrode using a lithium-nickel oxide as the positive-electrode active material.

The term "lithium-nickel oxide" here encompasses not only oxides having Li and Ni as constituent metal elements, but also composite oxides comprising one or two or more metal elements other than Li and Ni (that is, transition metal elements and/or typical metal elements other than Li and Ni) in proportions less than the proportion of Ni (as number of atoms, if there are two or more metal elements other than Li and Ni, the proportion of each is less than the proportion of Ni). Such metal elements may be one or two or more elements selected from the group consisting of Co, Al, Mn, Cr, Fe, V, Mg, Ti, Zr, Nb, Mo, W, copper, Zn, Ga, In Sn, La and Ce. Similarly, the term "lithium-cobalt oxide" encompasses composite oxides comprising one or two or more metal elements other than Li and Co in proportions less than the proportion of Co, and the term "lithium-manganese oxide" encompasses composite oxides comprising one or two or more metal elements other than Li and Mn in proportions less than the proportion of Mn.

A lithium-transition metal oxide powder (hereunder, sometimes called an active material powder) prepared and provided by ordinary methods for example can be used as such a (typically particulate) lithium-transition metal oxide. For example, a lithium-transition metal oxide powder composed substantially of secondary particles with an average particle diameter in the range of about 1 µm to 25 µm (typically about 2 µm to 15 µm) can be adopted favorably as the positive-electrode active material in the technology disclosed here.

The positive-electrode active material composition used in the method disclosed here may be an aqueous composition in the form of the active material dispersed in an aqueous solvent. Moreover, the positive-electrode active material disclosed here may be formed using this aqueous composition. The term "aqueous solvent" here means water or a mixed solvent consisting mainly of water. One or two or more organic solvents (lower alcohols, lower ketones or the like) that are uniformly miscible with water can be selected and used appropriately as solvents other than water in this mixed solvent. For example, it is desirable to use an aqueous solvent wherein about 80 mass % or more (preferably at least 90 mass %, more preferably at least 95 mass %) of the aqueous solvent is water. An aqueous solvent consisting effectively of water is a particularly desirable example. The solids concentration (proportion of non-volatile components or in other words active material layer-forming components) of the positive-electrode active material composition is not particularly limited but may be about 40 to 60 mass %.

In addition to the positive-electrode active material and aqueous solvent, this positive-electrode active material composition typically contains a conductive material for improving the electrical conductivity of the positive-electrode active material layer. A carbon material such as carbon powder or carbon fiber for example can be used favorably as this conductive material. A conductive metal powder such as nickel powder can also be used. One of these may be used, or two or more may be used in combination. Various kinds of carbon black (for example, acetylene black, furnace black, Ketjen black), graphite powder and other carbon powders can be used as the carbon powder. Of these, acetylene black can be used by preference. For example, it is desirable to use a particulate conductive material (for example, an acetylene black or other particulate carbon material) in which the constituent particles (typically primarily particles) have an average particle diameter in the range of about 10 nm to 200 nm (for example, about 20 nm to 100 nm).

As necessary, the positive-electrode active material composition may contain one or two or more materials that can normally be compounded with positive-electrode active material compositions (typically aqueous compositions) for producing lithium ion battery positive electrodes for example. Examples of such materials include various polymer materials that can function as binders for the positive-electrode active material. Polymer materials that are conventionally used as binders when preparing aqueous active material compositions can be selected and used appropriately as such polymer materials. It is desirable to use a polymer material that is effectively insoluble in organic solvents but which dissolves or disperses in water. Examples of polymer materials that dissolve in water (are water soluble) include carboxymethyl cellulose (CMC), methyl cellulose (MC), cellulose acetate phthalate (CAP), hydroxypropyl methylcellulose (HPMC), hydroxypropyl methylcellulose phthalate (HPMCP) and other cellulose derivatives; polyvinyl alcohol (PVA); and other water-soluble polymers. Of these, CMC is preferred. Examples of polymers that disperse in water (are water-dispersible) include polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer (ETFE) and other fluorine resins, vinyl acetate copolymers, styrene butadiene block copolymer (SBR), acrylic acid modified SBR resin (SBR latex), gum arabic and other gums and the like. Of these, a fluorine resin such as PTFE is preferred. One of these polymer materials may be used, or a combination of two or more may be used.

The amount of the positive-electrode active material as a percentage of the positive-electrode active material layer as a whole (which is typically about the same as the amount of the positive-electrode active material as a percentage of the solids component of the positive-electrode active material composition) is preferably at least about 50 mass % (typically 50 to 95 mass %), or more preferably about 75 to 90 mass %. In a positive-electrode active material layer containing a conductive material, the percentage of the conductive material in the active material layer can be about 3 to 25 mass % or preferably about 3 to 15 mass %. In this case, a suitable percentage of the positive-electrode active material in the active material layer is about 80 to 95 mass % (such as 85 to 95 mass %).

In a composition containing positive-electrode active material layer-forming components other than the positive-electrode active material and conductive material (such as polymer materials), the total percentage content of these optional components (as a percentage of the total positive-electrode active material layer-forming components) is preferably about 7 mass % or less or more preferably about 5 mass % or less (such as about 1 to 5 mass %). The total percentage content of these optional components can be about 3 mass % or less (such as about 1 to 3 mass %).

In the method disclosed here, a barrier layer is first provided on the collector surface, and the positive-electrode active material composition is then applied on top of this barrier layer to form the active material layer. The composition and method of forming the barrier layer are explained in detail below.

This barrier layer contains a water-insoluble polymer material (typically a polymer material that is effectively insoluble in pH neutral to alkaline water) and a conductive material. One or two or more materials capable of forming a water-resistant coating on the surface of the collector can be selected and used appropriately as this water-insoluble polymer material. It is desirable to use a material that is resistant to the electrolyte (typically a liquid electrolyte or in other words an electrolyte solution) of the battery configured using the electrode (typically a lithium ion battery) and to the battery reaction. Polyinylidene fluoride (PVDF), polyvinylidene chloride (PVDC), polyethylene oxide (PEO), polypropylene oxide (PPO), polyethylene oxide-propylene oxide copolymer (PEO-PPO) or the like for example can be used as this water-insoluble polymer material. Among these, PVDC is most preferred.

The conductive material used in composing the barrier layer comprises at least a first conductive powder and a second conductive powder with an average particle diameter greater than that of the first conductive powder. The particles making up each conductive powder may be of effectively the same size (that is, monodispersed), but normally it is desirable to use first and second conductive powders each having specific particle size distributions. The entire conductive material comprising two powders (here the first and second conductive powders) each with its own specific particle size distribution and with average particle diameters different from one another typically has a bimodal particle size distribution.

Carbon materials, conductive metal powders and the like similar to those given as examples of constituents in the active material composition (active material layer) can be used for the first and second conductive powders. Of these, a particulate carbon material such as acetylene black is particularly desirable. The first and second conductive powders may be of the same material (both acetylene black for example), or of different materials (for example, acetylene black combined with Ketjen black, or acetylene black combined with carbon fiber). A combination of the same material with different average particle diameters (particularly a combination of different sizes of acetylene black) can be adopted by preference.

The average particle diameter of the first conductive powder is not particularly limited but is preferably in the range of about 10 nm to 200 nm (more preferably about 20 nm to 100 nm, such as 20 nm to 50 nm). A powder with an average particle diameter larger than that of the first conductive powder is used for the second conductive powder. For example, the ratio of the average particle size D2 of the second conductive powder to the average particle size D1 of the first conductive powder (D2/D1) is preferably at least about 1.2 or more preferably at least about 1.5 or still more preferably at least about 2. There is no particular upper limit to D2/D1, but normally it should be no more than 200. For example, a second conductive powder with an average particle diameter of 30 nm to 10 μm (more preferably 50 nm to 5 μm) meeting the condition of D2/D1 can be used by preference.

The optimal average particle sizes of the first conductive powder and second conductive powder will differ depending on the thickness of the barrier layer. For example, a powder having an average particle diameter D1 that is no more than about $1/20^{th}$ (typically about $1/200^{th}$ to $1/20^{th}$ or more preferably about $1/100^{th}$ to $1/40^{th}$) the thickness $T_B$ of the barrier layer can be used by preference as the first conductive powder. A powder having an average particle diameter D2 that is larger than D1 (that is, D1<D2) and that is at least about $1/60^{th}$ (typically at least ($1/40^{th}$) of the thickness $T_B$ of the barrier layer can be used by preference as the second conductive powder. A second conductive powder wherein D2 is greater than $T_B$ can also be used by preference. D2 has no particular upper limit but is normally no more than 4 times (preferably no more than 3 times) the thickness $T_B$ of the barrier layer. When using such a second conductive powder with a D2 greater than $T_B$, the "thickness of the barrier layer" is a thickness (average thickness) calculated by dividing the mass per unit area of the formed barrier layer by the density of the barrier layer.

The mass ratio of the conductive material (including first and second conductive powders) to the polymer material in the barrier layer (which is typically the same as the mass ratio of the conductive material to the polymer material in the barrier layer-forming composition) can be about 60/40 or less (typically about 10/90 to 60/40) for example, and is preferably about 50/50 or less (typically about 20/80 to 50/50, such as 30/70 to 40/60). If this mass ratio is below this range it will be difficult to ensure adequate conductive paths in the barrier layer, and the conductivity of the electrode will tend to be less. If the conductive material/polymer material mass ratio is above this range, on the other hand, the water resistance of the barrier layer will tend to be less.

The barrier layer disclosed here preferably contains the first conductive powder in a greater proportion (mass ratio) than the second conductive powder. For example, a barrier layer containing the second conductive powder in the amount of at least 1 part by mass but less than 100 parts by mass (preferably about 10 to 50 parts by mass) per 100 parts by mass of the first conductive powder is desirable. If the proportion of the second conductive powder relative to the first conductive powder is less than this it will be difficult to achieve the grater effects obtained by combined use of the two powders. If the proportion of the second conductive powder relative to the first conductive powder is too high, on the other hand, water resistance may be adversely affected.

Typically, this barrier layer can be formed by applying and drying on the surface of the collector a barrier layer-forming composition prepared by adding and mixing together the aforementioned conductive material (comprising at least a first and second conductive powders), a water-insoluble polymer material and a suitable solvent (typically one capable of dissolving the polymer material). The solvent in the composition can be selected appropriately after considering compatibility with the water-insoluble polymer used. Organic solvents (nonaqueous solvents) conventionally used in preparing solvent-based active material layer-forming pastes can be used by preference. Examples of such organic solvents include N-methyl-2-pyrrolidone (NMP), methylethyl ketone, toluene and the like. Of these, NMP can be used by preference for example. The solids concentration (percentage of nonvolatile components or in other words barrier layer-forming components, hereunder abbreviated as "NV") of the barrier layer-forming composition is not particularly limited but can be about 1 to 30 mass % (preferably 5 to 20 mass %) for example. If the NV is too high, the handling properties (such as the coating properties and the like when the composition is applied to a collector (particularly a foil collector)) are likely to decline. If the NV is too low, costs will be higher because more of the organic solvent will be used.

A mode in which the second conductive powder, solvent and polymer material are mixed first when preparing the barrier layer-forming composition (preferably until the polymer material and second conductive powder are uniformly dissolved and dispersed), and the first conductive powder is then added to this mixture and mixed and dispersed, can be adopted by preference, although this is not a limitation. This mode is suited to preparation of a barrier layer-forming composition containing a uniformly dispersed first conductive powder having a relative small average particle size, (since such powders tend to be difficult to disperse uniformly). The first conductive powder can be added all at once, in multiple batches, or gradually (continuously). For example, it is desirable to add the total amount of the first conductive powder in 2 to 50 (preferably 3 to 20, such as 5 to 10) separate additions, typically in equal amounts and at specific time intervals (such as every 3 to 10 minutes). Either the polymer material or the second conductive powder can be mixed first with the solvent, or the two can be mixed with the solvent simultaneously.

The barrier layer-forming composition can be applied to the collector surface preferably using a conventionally known suitable coating device (such as a slit coater, die coater, comma coater, and gravure coater). After coating, the coated material is dried (using a drying promotion means (such as a heater) as necessary) to form the barrier layer. The coated amount of the barrier layer-forming composition is not particularly limited, but if the amount is too low the formed barrier layer will tend to be less water resistant, while if too much is coated the barrier layer (and therefore the electrode) will tend to be less conductive. To balance water resistance with conductivity, therefore, the coated amount should normally be about 0.1 to 10 g/m$^2$ (as solids) per side of the collector, and for example about 1 to 5 g/m$^2$ (as solids) is preferred.

The operation of applying the active material composition on this barrier layer to form the active material layer (which typically includes a composition coating operation and a coat drying operation) can be accomplished in the same way as the operation of applying the barrier layer-forming composition to the collector to form the barrier layer. The coated amount of the active material composition is not particularly limited, and will different according to the shape and intended application of the positive electrode and battery. For example, the active material layer should preferably be formed relatively thickly so that the ratio of the thickness of the barrier layer to the thickness of the active material layer (barrier layer: active material layer) is about 1:5 to 1:100 (typically this is the thickness ratio after pressing).

A layered body (positive electrode) obtained in this way can be pressed as desired in the direction of thickness to obtain a positive electrode sheet of the desired thickness. A pressing method such as conventional roll pressing, plate pressing or the like can be adopted as the pressing method.

When a carbon material is used as the conductive material in producing the electrode, it is desirable to select a carbon material (such as acetylene black) with a small volatile component. A smaller volatile component in the carbon material correlates with fewer functional groups on the surface of the carbon material. A carbon material with few surface functional groups is desirable because the gas production effect from contact between the carbon material and the electrolyte (typically an electrolyte solution) is less when a battery is configured and conditioned by ordinary methods using the carbon material (and less gas is generated during conditioning as a result). For example, it is desirable to use a carbon material having a volatile component of about 1% or less (typically about 0.1 to 1%) as measured in accordance with JIS K6221.

A preferred mode of electrode (for example lithium ion battery electrode) production by the production method disclosed here is explained below based on the cross-section of FIG. 1 (which shows only one face of the collector) and the flow chart of FIG. 2. First, collector (aluminum foil for example) 32 is prepared (Step S100). A barrier layer-forming composition is also prepared containing first conductive powder 331, second conductive powder 332 and water-insoluble polymer material 334 (Step S110). The barrier layer-forming composition prepared in Step S110 is then applied to one or both faces of collector 32, and the applied material is dried to form barrier layer 33 (Step S120). Next, an aqueous active material composition containing active material (for example, lithium-nickel oxide powder) 351, conductive material 352 and polymer material 354 is applied to the top of barrier layer 33 formed in Step S120, and the applied material is dried to form active material layer 35 (Step S130). The whole is then pressed and cut to the desired size as necessary to obtain electrode 30 of the target thickness and size.

The time between application of the active material composition and drying of the applied material can be set according to the degree of water resistance of the barrier layer in the electrode. For example, the active material composition should be dried for a period of time shorter than the water resistance time of the barrier layer (which is determined by water resistance testing as given in the examples below). In this way, a high-performance electrode (for example, one whereby production of the aforementioned high-electrical-resistance compounds is controlled, and which is therefore suited to construction of a high-output battery) can be stably manufactured. From the standpoint of electrode production efficiency, flexibility of line design and the like, a preferred mode of the electrode disclosed here from a practical standpoint has a barrier layer that provides water resistance (water resistance time) of about 2 minutes or more in the water resistance test described in the examples below. A barrier layer with a water resistance time of about 3 minutes or more (or more preferably 4 minutes or more) is still more desirable. A barrier layer with a film resistance of no more than 7 $m\Omega \cdot cm^2$ (or more preferably no more than 6 $m\Omega \cdot cm^2$) according to the film resistance measurement described in the examples below is also desirable.

Figure 2:
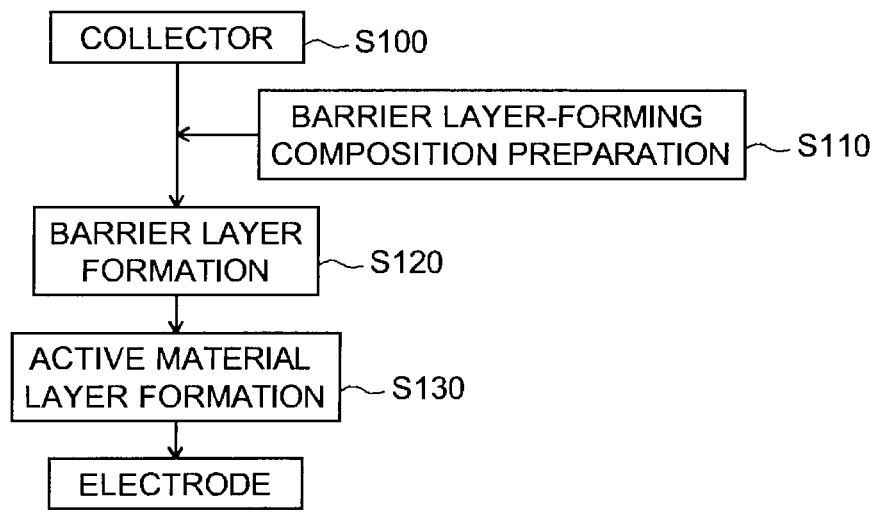
FIG. 2 is a flow chart illustrating the general production method of an electrode of one embodiment.
Figure 3:
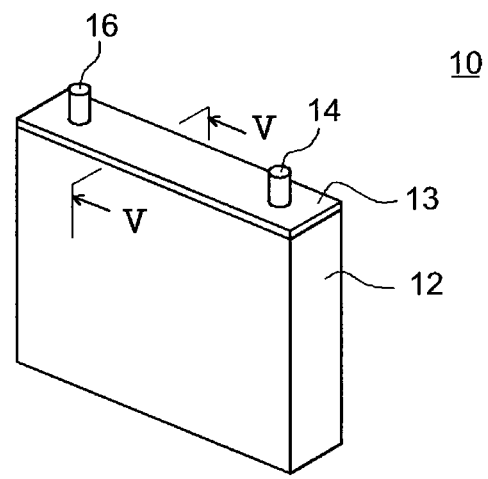
FIG. 3 is a model oblique view showing a battery of one embodiment.

An electrode formed in this way has barrier layer 33 comprising conductive material 330 and water-insoluble polymer material 334 on the surface of collector 32, with active material layer 35 comprising active material 351, conductive material 352 and polymer material 354 formed on this barrier layer 33 as shown in the model cross-section of FIG. 1 for example. The conductive material 330 contained in barrier layer 33 comprises relatively small first conductive powder 331 and relatively large second conductive powder 332.

Figure 10:
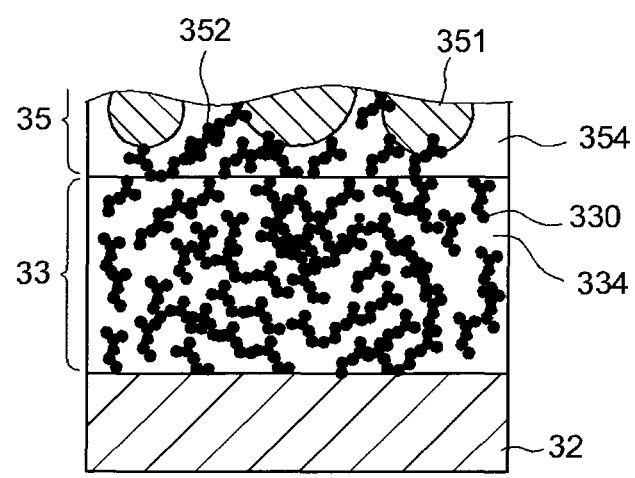
FIG. 10 is a model cross-section for explaining the functions of an electrode containing no second conductive powder.

As shown in the model cross-section of FIG. 10, in the case of a barrier layer 33 with a configuration comprising only a conductive material with a particle size similar to that of the first conductive powder 331 shown in FIG. 1 for example as conductive material 330 making up the barrier layer 33, conductive material 330 must be separated by polymer material 334 in order to ensure sufficient water resistance for practical purposes, resulting in fewer conductive paths between active material layer 35 and collector 32, or else the conductive paths are narrower because of the smaller particle size of conductive materials 330.

With an electrode of the configuration shown in FIG. 1, addition of second conductive powder 332 to the configuration shown in FIG. 10 ensures that wider conductive paths are formed via second conductive powder 332 between first conductive powder 331, allowing for more efficient electron movement between active material layer 35 and collector 32. As a result, the conductivity of barrier layer 33 can be improved.

A barrier layer using the technology disclosed here may have a composition comprising effectively only the first conductive powder and second conductive powder as conductive materials, but may also contain a third or further conductive powder in addition to the first and second conductive powders as long as the effect of the present invention is not greatly affected. In one preferred embodiment, the conductive materials in the barrier layer consist effectively of only the first conductive powder and the second conductive powder.

The electrode provided by the present invention is used by preference as an electrode (for example, positive electrode) for configuring various kinds of batteries. For example, it is suitable as a component of a lithium ion battery provided with a positive electrode using the electrode, a negative electrode comprising a negative electrode active material layer supported on a negative-electrode collector, an electrolyte disposed between the positive and negative electrodes and typically a separator separating the positive- and negative-electrode collectors (although this may be unnecessary if the electrolyte is solid). There are no particular limitations on the structure (for example, metal package or laminated film structure) or size of the container of the battery, or on the structure of the electrode assembly having the positive- and negative-electrode collectors as principal constituents (for example, coiled structure or laminated structure) or the like.

One embodiment of an electrode provided by the present invention and a lithium ion battery having this electrode are explained below with reference to the drawings shown in FIGS. 1 and 3 to 5.

As shown in the drawings, lithium ion battery 10 of this embodiment is provided with metal (resin or laminated film is also suitable) package (container) 12, and this package 12 contains coiled electrode assembly 20, which is composed of elongated positive-electrode sheet 30, separator 50A, negative-electrode sheet 40 and separator 50B laminated in this order and then coiled as a flat sheet.

Positive electrode 30 has been produced by applying any of the methods disclosed here, and comprises elongated sheet-shaped positive-electrode collector 32, barrier layer 33 (see FIG. 1) formed on one or both faces of the collector, and positive-electrode active material layer 35 formed on the barrier layer. Typically, these layers 33 and 35 should be formed on roughly the same area (that is, almost completely overlapping each other) on positive-electrode collector 32. Alternatively, barrier layer 33 can be provided with a greater area than active material layer 35. Barrier layer 33 is preferably provided so as to encompass the entire area covered by active material layer 35.

Figure 4:
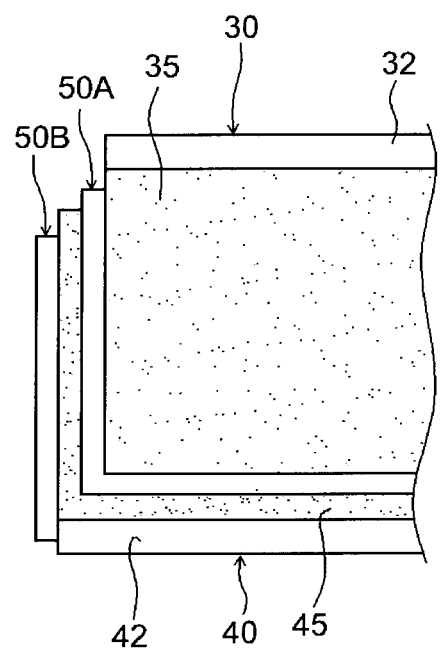
FIG. 4 is a model plane view showing the positive and negative electrodes and separators making up the battery of one embodiment.
Figure 5:
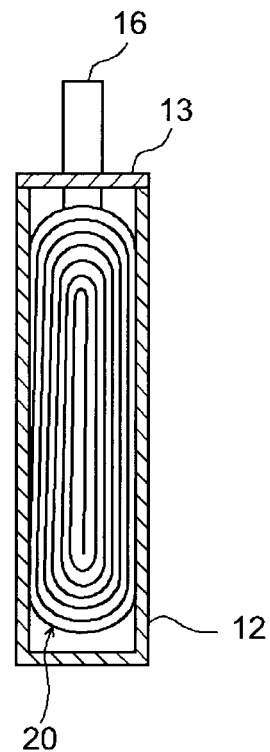
FIG. 5 shows a cross-section along line V-V in FIG. 3.

Meanwhile, negative electrode 40 is provided with elongated sheet-shaped negative-electrode collector 42 with negative-electrode active material layer 45 formed on the surface thereof. A sheet material consisting of a metal such as copper (typically a copper or other metal foil) can be used by preference for negative-electrode collector 42. A carbon material (such as natural graphite) containing a graphite structure (layered structure) in at least one part can be used by preference for the negative-electrode active material. A negative-electrode active material composition (preferably an aqueous composition) prepared by mixing such a negative-electrode active material with a binder (which may be similar to the polymer materials in the active material layer of the positive electrode) and a conductive material (which may be similar to those of the active material layer of the positive electrode) as necessary is coated on one or both faces of negative-electrode collector 42. The coated material can then be dried to form negative-electrode active material layer 45 at a desired site on collector 42 (FIG. 4). The amount of binder used is not particularly limited but can be in the range of 0.5 to 10 parts by mass per 100 parts by mass of the negative-electrode active material.

A porous film consisting of a polyolefin resin such as polyethylene or polypropylene for example can be used by preference for separators 50A and 50B superimposed on the positive- and negative-electrode sheets.

As shown in FIG. 4, the active material composition is not applied to one of the lengthwise edges of positive electrode sheet 30 and negative electrode sheet 40, thereby forming parts without active material layers 35 and 45. When positive and negative electrode sheets 30 and 40 are superimposed together with separators 50A and 50B, positive and negative electrode sheets 30 and 40 are offset so that active material layers 35 and 45 overlap each other but the part of the positive-electrode sheet without a active material layer and the part of the negative-electrode sheet without a active material layer are arranged separately on opposite edges in the lengthwise direction. These four sheets 30, 40, 50A and 50B are coiled in this configuration, and the resulting coiled body is pressed from the sides to form flattened coiled electrode assembly 20.

Next, the resulting coiled electrode assembly 20 is contained in package 12 (FIG. 5), while the parts of the positive and negative electrodes without active material layers are electrically connected in part to external connecting positive-electrode terminal 14 and external connecting negative-electrode terminal 16, respectively which are externally provided on package 12. A suitable nonaqueous electrolyte (for example, a suitable amount of a lithium salt (supporting salt) such as $LiPF_6$ dissolved in a mixed solvent of ethylene carbonate (EC) and diethylene carbonate (DEC)) is disposed (injected) into package 12, and the opening of package 12 is sealed by welding the package to the corresponding lid member 13 or the like to complete construction (assembly) of lithium ion battery 10. The process of sealing package 12 and the process of disposing (injecting) the electrolyte are not features of the present invention, and may be accomplished by methods conventionally used for producing lithium ion batteries.

Some examples of the present invention are explained below, but the present invention should not be limited to what is shown in these specific examples.

Example 1

A sheet electrode was prepared having an aluminum foil collector and a lithium-nickel oxide of the composition represented by $LiNiO_2$ as the positive-electrode active material.

That is, acetylene black (AB) with an average particle diameter of 35 nm (as the conductive material) and PVDF (as the polymer material) were mixed with NMP (organic solvent) to a mass ratio of 30:70 and a NV of about 9 mass % to prepare a solvent-based barrier layer-forming composition.

This barrier layer-forming composition was coated on both faces of a 15 μm-thick elongated aluminum foil (collector) to form a barrier layer on both faces of the collector. A gravure coater was used for coating the composition, and the coated amount (coating weight) was adjusted to about 2 g/m² (as solids) per side of the collector. This coating weight value (g/m²) corresponds roughly to the thickness (dried film thickness in μm) of the barrier layer formed after drying. In other words, at this coating weight a barrier layer is formed with a thickness of about 2 μm.

Example 2

A barrier layer-forming composition was prepared as in Example 1 except that the mass ratio of AB with an average particle diameter of 35 nm to PVDF was 35:65. Using this composition, a barrier layer about 2 μm thick was formed on both faces of a collector as in Example 1.

Example 3

AB with an average particle diameter of 35 nm (first conductive powder) and AB with an average particle diameter of 55 nm (second conductive powder) were used as the conductive materials in this example. These first and second conductive powders and PVDF were mixed with NMP to a mass ratio of 30:5:65 and an NV of about 9 mass % to prepare a barrier layer-forming composition. A barrier layer about 2 μm thick was formed on both faces of a collector as in Example 1 using this composition.

The performance of the collectors with barrier layers prepared in Examples 1 to 3 was evaluated by means of the following water resistance test and film resistance measurement. The results are shown in Table 1 together with the general compositions of the barrier layers of each example.

Water Resistance Test

A 0.1 mole/L sodium hydroxide (NaOH) aqueous solution was dripped on the surfaces (that is, barrier layer surfaces) of the collectors with barrier layers of each example and left for 300 seconds (that is, 5 minutes), and the time taken to strip the barrier layer (water resistance time) was observed.

Film Resistance Measurement

The collectors with barrier layers of each example were sandwiched between two copper plates and subjected to 2500 N of pressure, and sheet resistance ($\Omega/cm^2$) was measured by the four-terminal four-probe method specified by JIS K7194.

TABLE 1

| | 35 nm dia. (parts) | 55 nm dia. (parts) | Polymer material (parts) | Water resistance (seconds) | Film resistance (mΩ·cm²) |
|---|---|---|---|---|---|
| Ex. 1 | 30 | — | 70 | 300 | 7.5 |
| Ex. 2 | 35 | — | 65 | 30 | 4.2 |
| Ex. 3 | 30 | 5 | 65 | 270 | 4.9 |

As shown in Table 1, the conductivity of the barrier layer improved but the water resistance time was much shorter when the percentage content of the conductive material was increased from 30 mass % to 35 mass % in Examples 1 and 2 using only AB with an average particle diameter of 35 nm as the conductive material.

On the other hand, in Example 3 in which the percentage content of conductive material was increased by including 5 mass % AB with an average particle diameter of 55 nm without changing the percentage content of AB with an average particle diameter of 35 nm, the conductivity of the barrier layer was greatly improved while maintaining a sufficient water resistance time for practical purposes.

Film resistance was 4.2 mΩ·cm² but water resistance was less than 30 seconds or even poorer than in Example 2 in the case of a collector with barrier layer having a barrier layer prepared as above except that the mass ratio of AB with an average particle diameter of 35 nm to PVDF was changed to 40:60 (Example 4). On the other hand, film resistance was 4.3 mΩ·cm² and water resistance was 45 seconds in the case of a collector with barrier layer having a barrier layer prepared as above except that the mass ratio of AB with an average particle diameter of 35 nm (first conductive powder), AB with an average particle diameter of 55 nm (second conductive powder) and PVDF was changed to 30:10:60 (Example 5). In other words, Examples 4 and 5 also served to confirm that the effect of suppressing a decrease in water resistance due to increased conductive material content can be achieved by combining a first and second conductive powders.

While the viscosity of the composition of Example 1 (NV 9 mass %) containing 30 parts of AB with an average particle diameter of 35 nm as the conductive material was 12200 mPa·s, the viscosity of the composition of Example 4 (NV 9 mass %) in which the AB content was increased to 40 parts was 14350 mPa·s, or higher than that of the composition of Example 1. On the other hand, a composition in which 10 parts of the 40 parts of AB with an average particle diameter of 35 nm used in Example 4 were replaced with AB with an average particle diameter of 76 nm (that is, an NV 9 mass % composition containing 35 nm AB, 76 nm AB and PVDF with a mass ratio of 30:10:70) was much less viscous than the composition of Example 4. Therefore, the NV of the barrier layer-forming composition was increased further while maintaining a viscosity equal to or less than that of the composition of Example 1. Specifically, the amount of NMP was reduced while maintaining the mass ratio of the first and second conductive powders and polymer material at 30:10:60 to prepare a barrier layer-forming composition with an NV of about 12 mass % (Example 6). The viscosity of the composition of this Example 6 was 10350 mPa·s. This composition was coated on a collector under the same gravure coating conditions as in Example 1 and dried to obtain a collector with barrier layer comprising a roughly 2.5 μm-thick barrier layer formed on both faces of the collector. The viscosities of the barrier layer-forming compositions above were all measured at 25° C. using a B-type viscometer.

The collector with barrier layer of Example 6 was subjected to water resistance testing and film resistance measurement as in Examples 1 to 5. These results and the general compositions of the barrier layers of each example are shown in Table 2. The data for Examples 1 and 4 are also shown in this table.

Example 6 exhibited adequate water resistance, with a water resistance time of 200 seconds or more, and good electrical conductivity.

Example 7

In this example, AB with an average particle size of 35 nm (first conductive powder) and AB with an average particle size of 4 μm (second conductive powder) were used as the conductive materials. The first and second conductive powders and PVDF were mixed with NMP to a mass ratio of 30:3:67 and an NV of about 9 mass % to prepare a barrier layer-forming composition. This composition was gravure coated on both faces of a collector to a coating weight of about 2 g/m² (as solids) per side and dried to form a roughly 2 μm-thick (average thickness) barrier layer on both sides of the collector. That is, the average particle size of the second conductive powder in this example was greater than the average thickness of the barrier layer.

Examples 8 to 11

Barrier layers about 2 μm thick (average thickness) were formed on both faces of collectors as in Example 7 except that the mass ratios of AB with an average particle diameter of 35 nm, AB with an average particle diameter of 4 μm and PVDF were changed to 30:6:64 (Example 8), 30:9:61 (Example 9), 30:12:58 (Example 10) and 30:15:55 (Example 11).

The collectors with barrier layers of Examples 7 to 11 were subjected to water resistance testing and film resistance measurement as before.

Sheet electrodes (electrode sheets) were also prepared using the collectors with barriers layers of Example 1 and Examples 7 to 11. That is, lithium nickel oxide powder (positive-electrode active material), acetylene black with an average particle diameter of 48 nm (conductive material) and CMC (polymer material) were mixed with ion exchange water to a mass ratio of 87:10:3 of the materials and an NV of about 45 mass % to prepare an aqueous active material composition. This active material composition was applied on top of the barrier layers in the samples of each example (collectors with barrier layers) and dried to form active material layers. The coated amount (as solids) of the active material composition was adjusted to about 12.8 g/m² for both faces.

TABLE 2

| | 35 nm dia. (parts) | 76 nm dia. (parts) | Polymer material (parts) | Viscosity (mPa·s) | NV (%) | Coating weight (g/m²) | Water resistance (seconds) | Film resistance (mΩ·cm²) |
|---|---|---|---|---|---|---|---|---|
| Ex. 1 | 30 | — | 70 | 12200 | 9 | 2 | 300 | 7.5 |
| Ex. 4 | 40 | — | 60 | 14350 | 9 | 2 | <30 | 4.2 |
| Ex. 6 | 30 | 10 | 60 | 10350 | 12 | 2.5 | >200 | 3.5 |

As shown in Table 2, in the case of the barrier-forming composition of Example 6 a composition with a viscosity suited to coating under the gravure coating conditions used for the composition of Example 1 could be obtained even as the NV was raised to 1.5 times that of Examples 1 and 4, which used only a first conductive powder, because a first conductive powder was used together with a second conductive powder having an average particle diameter at least twice that of the first conductive powder as the conductive material. A barrier layer thicker (with a greater coating weight) than that of Example 1 was formed in Example 6 by applying a composition with such a high solids content under the same coating conditions as in Example 1. The barrier layer of Example 6 exhibited adequate water resistance, with a water resistance time of 200 seconds or more, and good electrical conductivity.

After the active material composition had dried, the total thickness including the collector and the electrode film (barrier layer and active material layer) formed thereon was about 80 μm. This was then pressed to a total thickness of 64 μm.

The sheet resistance of the electrode sheets of Examples 1 and 7 to 11 thus obtained was measured as follows.

Sheet Resistance Measurement

Two sheets each of the electrode sheets of Examples 1 and 7 to 11 were superimposed and subjected to 2500 N of pressure, and sheet resistance (mΩ·cm²) was measured by the four-terminal four-probe method in accordance with JIS K7194.

Figure 8:
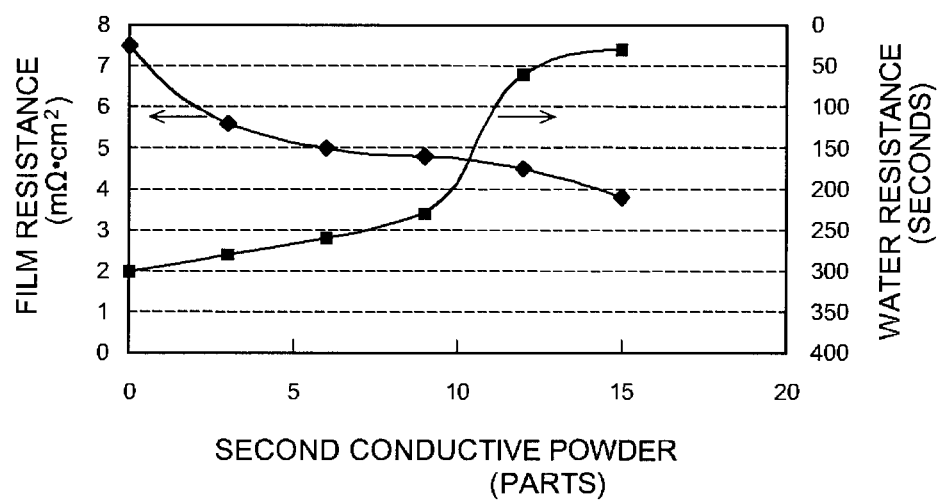
FIG. 8 is a graph showing the relationship between second conductive powder content and film resistance and water resistance.

The results of the aforementioned water-resistance evaluation, film resistance measurement and sheet resistance measurement are shown in Table 3 and FIG. 8 together with the general compositions of the barrier layers of each example.

without sacrificing coating properties. A barrier layer with good water resistance and electrical conductivity can be formed using such a high-solids barrier layer-forming composition.

TABLE 3

| | 35 nm dia. (parts) | 4 μm dia. (parts) | Polymer material (parts) | Viscosity (mPa · s) | Water resistance (seconds) | Film resistance (mΩ · cm$^2$) | Sheet resistance (mΩ · cm$^2$) |
|---|---|---|---|---|---|---|---|
| Ex. 1 | 30 | — | 70 | 12200 | 300 | 7.5 | 73 |
| Ex. 7 | 30 | 3 | 67 | 11120 | 280 | 5.6 | 60 |
| Ex. 8 | 30 | 6 | 64 | 9950 | 260 | 5.0 | 57 |
| Ex. 9 | 30 | 9 | 61 | 8780 | 230 | 4.8 | 55 |
| Ex. 10 | 30 | 12 | 58 | 7630 | 60 | 4.5 | 50 |
| Ex. 11 | 30 | 15 | 55 | 6315 | 30 | 3.8 | 49 |

Figure 7:
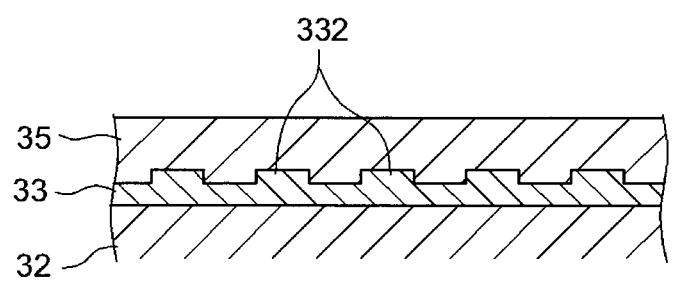
FIG. 7 is a model cross-section for explaining the functions of a battery of another embodiment.

As shown in Table 3 and FIG. 8, in Examples 7 to 9 in which a first and second conductive powders with differing average particle diameters were used together as the conductive materials in proportions of about 10:1 to 3:1 and with a total content of about 33 to 40 mass %, good water resistance was ensured with a water resistance time of 3.5 minutes or more, while at the same time film resistance and sheet resistance were reduced. Examples 13 to 16 below (see Table 6) are examples using AB with an average particle diameter of 70 nm in place of the AB with an average particle diameter of 4 μm as the second conductive powder, in the same proportions as in Examples 7 to 10, respectively. It can be seen from comparing these Examples 7 to 10 with Examples 13 to 16 that a barrier layer with even lower film resistance (greater conductivity) than in Examples 13 to 16 could be formed in Examples 7 to 10 using AB with an average particle diameter thicker than the barrier layer as the second conductive powder even though the percentage content of the second conductive powder was the same. This could be attributed to the larger are of contact between barrier layer 33 and active material layer 35 due to the irregular shape of the surface of barrier layer 33 having protruding particles of second conductive powder 332 larger than the thickness of barrier layer 33 as shown in the model view of FIG. 7, and/or to the formation of good conductive paths between active material layer 35 and collector 32 via second conductive powder 332 because second conductive powder 332 penetrates the thickness of barrier layer 33.

The water resistance of the barrier layer was lower in Examples 10 and 11 in which the percentage content of the second conductive powder was greater than 10 parts (specifically 12 parts or more). The fact that there was no particular loss of sheet resistance of the electrode sheet prepared by applying an aqueous material composition to the collectors with barrier layers of Examples 10 and 11 can be attributed to the short time between application and drying of the active material composition in this test.

It was also confirmed in the case of the barrier layer-forming compositions of Examples 7 to 11 that the viscosity of a composition can be reduced below that of a composition containing the same quantity of conductive material consisting only of a first conductive powder by using a second conductive powder with a large average particle diameter for part of the conductive material contained in the composition. Consequently, it should be possible to raise the solids contents (to approximately NV 12% or more for example, typically approximately NV 12 to 20%) of the barrier layer-forming compositions of Examples 7 to 11 as in Example 6

Examples 8a to 8d

Using the barrier layer composition of Example 8, the effect on film resistance of the operations (preparation conditions) during preparation of the barrier layer-forming composition was investigated.

That is, in Example 8 above the total amount of the second conductive powder, the total amount of PVDF and the total amount of NMP used in preparation were placed in a agitator (triple shaft planetary type disperser, trade name "T. K. Hivis Disper Mix", available from Primix Corporation), and uniformly dissolved and dispersed. The total amount of the first conductive powder (100 g in this case) was added gradually in batches of 15 g (10 g in the last batch) at 5-minute intervals to prepare the barrier layer-forming composition.

The amount of the first conductive powder added in each batch when preparing the barrier layer-forming compositions of Examples 8a to 8d was different than in Example 8. That is, the amount of the first conductive powder added at 5-minute intervals (that is, the addition rate of the first conductive powder) was 5 g (in Example 8a), 10 g (in Example 8b), 20 g (in Example 8c) and 25 g (in Example 8d). In all other respects, the barrier layer-forming compositions of Examples 8a to 8d were prepared in the same way as the barrier layer-forming composition of Example 8. The agitation rate was fixed in Example 8 and Examples 8a to 8d (peripheral speed 7 m/second in all cases), and the agitation time was the same in all cases.

Figure 9:
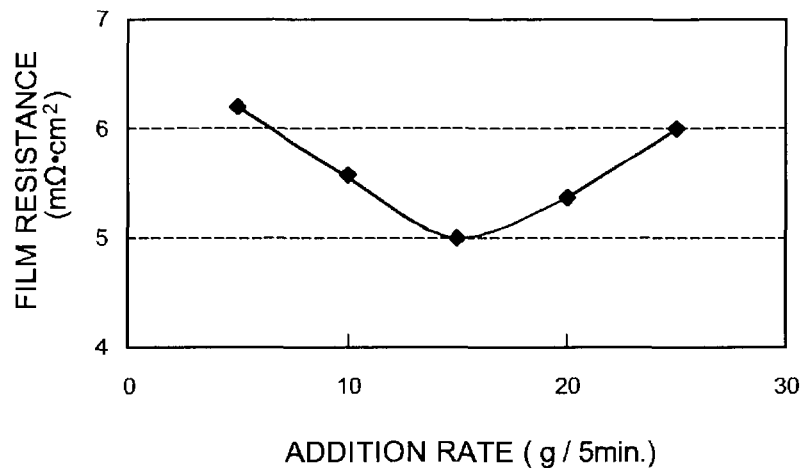
FIG. 9 is a graph showing the relationship between film resistance and addition rate of the first conductive powder.

Collectors with barrier layers were prepared as in Example 8 using the barrier layer-forming compositions of Examples 8a to 8d, and the film resistance values were measured. The results are shown in Table 4 and FIG. 9.

TABLE 4

| | Addition rate (g/5 minutes) | Film resistance (mΩ · cm$^2$) |
|---|---|---|
| Example 8a | 5 | 6.2 |
| Example 8b | 10 | 5.6 |
| Example 8 | 15 | 5 |
| Example 8c | 20 | 5.4 |
| Example 8d | 25 | 6 |

As shown in the figure and table, a barrier layer with the best electrical conductivity was obtained when the barrier layer-forming composition was prepared with the addition rate of Example 8 out of all of the examples. It could also be said that a barrier layer with better conductivity could be formed when 1/10 (Example 8b) to 1/5 (Example 8c) of the total amount of the first conductive powder was added in each batch than when more or less was added in each batch.

Example 8e

The volatile portion of the AB with an average particle diameter of 35 nm (first conductive powder) used in Example 8 was 1%, while the volatile portion of the AB with an average particle diameter of 4 μm (second conductive powder) was 0.7%. In this example a barrier layer-forming composition of the same composition as in Example 8 (that is, a solvent-based composition with a NV of 9 mass % containing a first conductive powder, second conductive powder and PVDF at a mass ratio of 30:6:64) was prepared using AB powder with an average particle diameter of 35 nm and a volatile portion of 1.4% (first conductive powder) and AB with an average particle diameter of 4 μm and a volatile portion of 1.2% (second conductive powder) in place of the AB powders with smaller volatile portions. A barrier layer was formed as in Example 8 using this composition, and an active material layer was formed in the same way to obtain the electrode sheet of Example 8e.

Lithium ion batteries were prepared using the electrode sheets of Example 8 and Example 8e as the positive electrodes.

The negative electrodes were as follows. Natural graphite (powder), SBR and CMC were mixed with ion-exchange water to obtain a mass ratio of 98:1:1 of these materials and a NV of 45 mass %, to prepare an aqueous active material composition (negative-electrode active material composition). This composition was applied to both faces of a roughly 15 μm-thick elongated copper foil (negative-electrode collector) and dried to form a negative-electrode active material layer. Once the negative-electrode active material had dried, the total thickness including the collector and the negative-electrode material layer formed on both sides thereof was about 120 μm. This was pressed to a total thickness of 85 μm. Sheet-shaped negative electrodes (negative electrode sheets) were prepared in this way.

These negative electrode sheets and the electrode sheets (positive electrode sheets) of each example were laminated together with two elongated separators (using porous polyethylene sheets in this case), and the laminated sheets were coiled lengthwise to prepare coiled electrode bodies. Each electrode assembly was contained together with a nonaqueous electrolyte in a laminated film container to configure a lithium ion battery with a capacity of about 500 mA. An electrolyte composed of a supporting salt ($LiPF_6$) dissolved to a concentration of 1 mol/L in a 3:7 (volume ratio) mixed solvent of EC and DEC was used as the nonaqueous electrolyte.

The lithium ion batteries thus configured were subjected to suitable conditioning (for example, constant current charging for 3 hours at a charge rate of 1/10 C, followed by initial charge-discharge treatment consisting of 2 to 3 repetitions of the operation of charging with constant current voltage at a charge rate of 1/3 C up to 4.1 V and the operation of constant current discharging at a discharge rate of 1/3 C up to 3.0 V), and the amount of gas generated was measured by the water substitution method. The results are shown in Table 5 together with the volatile portion of the conductive materials used.

TABLE 5

| | Volatile portion of first conductive powder (%) | Volatile portion of second conductive powder (%) | Amount of gas produced (mL) |
|---|---|---|---|
| Example 8 | 1.0 | 0.7 | 1.5 |
| Example 8e | 1.4 | 1.2 | 3.3 |

As shown in Table 5, the amount of gas generated by the battery was 1.5 mL in Example 8 using AB with a volatile portion of 1% or less for both the first and second conductive powders, but 3.3 mL in the case of the battery of Example 8e using AB with a greater volatile portion. This confirms that the effect of further reducing the amount of gas generated can be obtained by configuring the barrier layer using carbon materials with a smaller volatile portion (preferably 1% or less) for the conductive materials.

Example 12

AB with an average particle diameter of 40 nm and PVDF were mixed with NMP to a mass ratio of 30:70 and an NV of about 9 mass % to prepare a barrier layer-forming composition. A roughly 2 μm-thick barrier layer was formed on both faces of a collector as in Example 1 using this composition.

Example 13

AB with an average particle diameter of 40 nm (first conductive powder) and AB with an average particle diameter of 70 nm (second conductive powder) were used as the conductive materials in this example. These first and second conductive powders and PVDF were mixed with NMP to a mass ratio of 30:3:67 of the three materials and an NV of about 9 mass % to prepare a barrier layer-forming composition. A roughly 2 μm-thick barrier layer was formed on both faces of a collector as in Example 1 using this composition.

Examples 14 to 16

Barrier layers roughly 2 μm thick were formed on both faces of collectors as in Example 13 except that the mass ratio AB with an average particle diameter of 40 nm, AB with an average particle diameter 70 nm and PVDF was 30:6:64 (in Example 14), 30:9:61 (in Example 15) and 30:12:58 (in Example 16).

The water resistance and film resistance of the collectors with barrier layers prepared in Examples 12 to 16 were measured as before. The results are shown in Table 6 together with the general compositions of the samples of each example and the data from Example 1.

The collectors with barriers layers prepared in Example 1 and Examples 12 to 16 were also stored for 3 days indoors at temperature 20° C., relative humidity 65%, and the water content (amount of adsorbed moisture) in each collector with barrier layer was measured by the common Karl Fischer method. The results are included in Table 6.

The specific surface area of the AB with an average particle diameter of 35 nm used above was 68 $m^2/g$, while the specific surface area of the AB with an average particle diameter of 40 nm was 58 $m^2/g$, and the specific surface area of the AB with an average particle diameter of 70 nm was 27 $m^2/g$. The specific surface area of the conductive material contained in each unit area (square cm) of the barrier layer of each example (that is, the total surface area contained in 1 cm×1 cm×2 μm of barrier layer, hereunder called the "contained surface area") was calculated from these specific surface area measurements and the composition and thickness (2 μm in all cases) of each barrier layer. The results are included in Table 6.

TABLE 6

| | 35 nm dia. (parts) | 40 nm dia. (parts) | 70 nm dia. (parts) | Polymer material (parts) | Contained surface area (cm²/cm² · 2 μm) | Moisture (ppm) | Water resistance (seconds) | Film resistance (mΩ · cm²) |
|---|---|---|---|---|---|---|---|---|
| Ex. 1 | 30 | — | — | 70 | 46.8 | 380 | 300 | 7.5 |
| Ex. 12 | — | 30 | — | 70 | 34.8 | 183 | 320 | 7.6 |
| Ex. 13 | — | 30 | 3 | 67 | 36.4 | 190 | 290 | 6 |
| Ex. 14 | — | 30 | 6 | 64 | 38.0 | 195 | 280 | 5.7 |
| Ex. 15 | — | 30 | 9 | 61 | 40.0 | 219 | 270 | 5.4 |
| Ex. 16 | — | 30 | 12 | 59 | 41.3 | 230 | 60 | 5 |

As shown in Table 6, in the barrier layers of Examples 1 and 12 using the same percentage content of only one type of AB the contained surface area was reduced by using AB with a larger average particle diameter (smaller specific surface area). A smaller contained surface area in this case means less moisture adsorbed by the barrier layer. This reduction in moisture adsorption serves to reduce the amount of moisture introduced into the package when an electrode assembly provided with an electrode sheet having this barrier layer is contained together with a nonaqueous electrolyte in a package to configure a battery (such as a lithium ion battery). Reducing moisture introduction into the package is desirable because it helps to reduce the amount of gas generated during conditioning by ordinary methods following battery configuration for example. However, in Example 12 in which AB with an average particle diameter of 35 nm was simply replaced with AB with an average particle diameter of 40 nm, the effect of improving the conductivity of the barrier layer over Example 1 was not obtained.

In Examples 13 to 16 using a second conductive powder with an average particle diameter greater than that of the first conductive powder, on the other hand, the electrical conductivity of the barrier layer could be improved while limiting the increase in contained surface area (and therefore in adsorbed moisture) due to increased percentage content of the conductive materials. In particular, conductivity was improved and moisture adsorption was controlled while maintaining good water resistance in Example 13 to 15, in which first and second conductive powders with different average particle sizes were used together as the conductive materials in a ratio of roughly 10:1 to 3:1 and with a total content of about 33 to 40 mass % (and the contained surface area was 40 cm²/cm²·2 μm or less or more specifically in the range of 35 to 40 cm²/cm²·2 μm).

The present invention was explained in detail above, but the above embodiments are only examples, and the invention disclosed here encompasses various modifications and changes to these specific examples.

INDUSTRIAL APPLICABILITY

Figure 6:
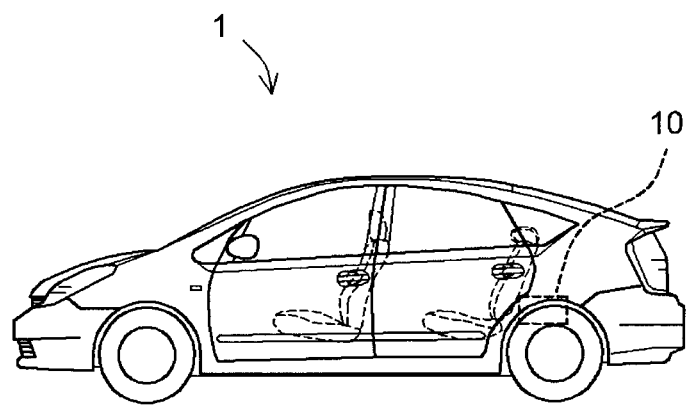
FIG. 6 is a model side view showing a vehicle (automobile) equipped with a lithium ion battery of one embodiment.

Because of its superior performance (output performance and the like) as described above, the lithium ion battery of the present invention can be used favorably as a motor power source to be installed in an automobile or other vehicle. This lithium ion battery can be used in the form of an assembled battery comprising multiple batteries arranged in a line and/or parallel to one another. Consequently, the present invention provides vehicle (typically an automobile, especially a hybrid automobile, electric automobile, fuel cell automobile or other automobile having a motor) 1 equipped with lithium ion battery (which may be in the form of an assembled battery) 10 as shown in FIG. 6.

The invention claimed is:
1. An electrode comprising:
a metal collector;
a barrier layer, containing a first conductive powder and a second conductive powder as a conductive material and a water-insoluble polymer material, provided on a surface of the metal collector; and
an active material layer, including a lithium-transition metal oxide capable of reversibly storing and releasing lithium ions as a principal component, formed by applying an aqueous active material composition to the barrier layer formed on the collector, wherein
an average particle diameter of the second conductive powder is greater than an average particle diameter of the first conductive powder,
the mass content of the first conductive powder in the barrier layer is greater than the mass content of the second conductive powder, and
the barrier layer is configured to block direct contact between the aqueous active material composition and the collector.
2. The electrode according to claim 1, wherein the average particle diameter of the second conductive powder is 2 or more times the average particle diameter of the first conductive powder.
3. The electrode according to claim 1, wherein the average particle diameter of the second conductive powder is greater than an average thickness of the barrier layer, the average thickness of the barrier layer being calculated by dividing the mass per unit area of the barrier layer by the density of the barrier layer.
4. The electrode according to claim 1, wherein a mass ratio of the conductive material to the water-insoluble polymer material in the barrier layer is 10/90 or more and 60/40 or less.
5. The electrode according to claim 1, wherein the average particle diameter of the first conductive powder is about 1/20 or less of a thickness of the barrier layer.
6. The electrode according to claim 1, wherein a weight of the barrier layer per unit area is 0.1 to 10 g/cm².
7. The electrode according to claim 1, wherein a ratio of a thickness of the barrier layer to a thickness of the active material layer is about 1:5 to 1:00.
8. The electrode according to claim 1, wherein sheet resistance of the barrier layer measured by the four-terminal four-probe method specified by JIS K7194 is 7 mΩ·cm² or less upon sandwiching the collector with the barrier layer between two copper plates and subjecting to 2500 N of pressure.

9. A battery configured using the electrode according to claim 1.

10. A vehicle equipped with a lithium on battery containing the electrode according to claim 1.

11. A method of producing an electrode including a metal collector and an active material layer having an electrode active material comprising a lithium-transition metal oxide capable of storing and releasing lithium ions as a principle component and supported by the metal collector,
the method comprising:
preparing a barrier layer-forming composition containing a first conductive powder and a second conductive powder as a conductive material, a water-insoluble polymer material and a solvent for dissolving the polymer material;
forming a barrier layer on a surface of the collector by applying the barrier layer-forming composition to the collector; and
forming an active material layer including a lithium-transition metal oxide by applying an aqueous active material composition to the collector having the barrier layer formed thereon,
wherein an average particle diameter of the second conductive powder is larger than an average particle diameter of the first conductive powder, and
the mass content of the first conductive powder is greater than the mass content of the second conductive powder.

12. The method according to claim 11, wherein the barrier layer-forming composition is prepared by mixing the second conductive powder and water-insoluble polymer material together with the solvent to make a mixture, and then further mixing the first conductive powder with the mixture.

13. The method according to claim 12, wherein the solvent in the barrier layer-forming composition is an organic solvent.

* * * * *